US009519792B1

(12) United States Patent  
Leske (10) Patent No.: US 9,519,792 B1  
(45) Date of Patent: Dec. 13, 2016

(54) COPYRIGHT PROTECTION

(71) Applicant: Google Inc., Mountain View, CA (US)

(72) Inventor: Matthew J. Leske, Stockholm (SE)

(73) Assignee: Google Inc., Mountain View, CA (US)

( * ) Notice: Subject to any disclaimer, the term of this patent is extended or adjusted under 35 U.S.C. 154(b) by 265 days.

(21) Appl. No.: 14/081,069

(22) Filed: Nov. 15, 2013

(51) Int. Cl.
*G06F 21/00* (2013.01)
*G06F 21/60* (2013.01)

(52) U.S. Cl.
CPC .................................. *G06F 21/60* (2013.01)

(58) Field of Classification Search
CPC .. G06F 21/10; G06F 21/60; G06F 2221/0737; G06F 2221/074; G06F 17/30026; G06F 17/30743; G06Q 10/00
USPC ... 726/22, 26, 30, 32; 725/25, 105; 715/716, 715/756; 379/203.01
See application file for complete search history.

(56) References Cited

U.S. PATENT DOCUMENTS

| 7,714,222 B2 | 5/2010 | Taub et al. | |
| 2009/0328236 A1* | 12/2009 | Schmelzer | G06F 17/30026 726/30 |
| 2010/0124322 A1* | 5/2010 | Bill | G06Q 10/00 379/203.01 |
| 2011/0261150 A1* | 10/2011 | Goyal | H04M 3/568 348/14.09 |
| 2012/0030230 A1 | 2/2012 | Sheinkop et al. | |

FOREIGN PATENT DOCUMENTS

| JP | 2004343515 | 12/2004 |
| WO | 97/49244 A1 | 12/1997 |

OTHER PUBLICATIONS

Liotta, et al., "The Operator's Response to P2P Service Demand", IEEE Communications Magazine, (Jul. 2007), pp. 76-83.

\* cited by examiner

*Primary Examiner* — Kambiz Zand
*Assistant Examiner* — Noura Zoubair (57) ABSTRACT

A method and computing system for receiving a plurality of discrete audio signals from a plurality of participants of a synchronous communication session. The plurality of discrete audio signals are combined to form a composite audio signal. At least a portion of the composite audio signal is divided into a plurality of sequential time slices. The plurality of sequential time slices are processed to identify one or more copyright-infringing time slices. The one or more copyright-infringing time slices are associated with a copyright infringing participant chosen from the plurality of participants of the synchronous communication session.

14 Claims, 6 Drawing Sheets

COPYRIGHT PROTECTION

BACKGROUND

This disclosure relates to copyright protection and, more particularly, to copyright protection within synchronous communication sessions. The Internet currently allows for the free exchange of ideas and information in a manner that was unimaginable only a couple of decades ago. One such use for the Internet is as a communication medium, whether it is via one-on-one exchanges or multi-party exchanges within social networks.

As is known in the art, social networks may allow for users to engage in a quasi-real-time, interactive dialogue. Included within social networks may be the ability to participate in video conferences, which are multiuser video chat rooms that allow for virtual gatherings of people so that they may chat about various topics. The Internet may provide users with the ability to broadcast (e.g., stream) these video conferences to a wide audience. Traditionally, this ability to broadcast was licensed to only a limited number of broadcasters (e.g., media/broadcast companies). With this enhanced ability to broadcast comes a measure of risk to the technology provider with respect to claims of abusive use and copyright violations.

SUMMARY OF DISCLOSURE

In one implementation, a computer-implemented method includes receiving a plurality of discrete audio signals from a plurality of participants of a synchronous communication session. The plurality of discrete audio signals are combined to form a composite audio signal. At least a portion of the composite audio signal is divided into a plurality of sequential time slices. The plurality of sequential time slices are processed to identify one or more copyright-infringing time slices. The one or more copyright-infringing time slices are associated with a copyright infringing participant chosen from the plurality of participants of the synchronous communication session. Associating the one or more copyright-infringing time slices with a copyright infringing participant includes: identifying a signal level for each of the discrete audio signals included within each of the copyright-infringing time slices, wherein each of the discrete audio signals is associated with one of the plurality of participants; and identifying a correlation between the one or more copyright-infringing time slices and the signal level for each of the discrete audio signals included within each of the copyright-infringing time slices.

In another implementation, a computer-implemented method includes receiving a plurality of discrete audio signals from a plurality of participants of a synchronous communication session. The plurality of discrete audio signals are combined to form a composite audio signal. At least a portion of the composite audio signal is divided into a plurality of sequential time slices. The plurality of sequential time slices are processed to identify one or more copyright-infringing time slices. The one or more copyright-infringing time slices are associated with a copyright infringing participant chosen from the plurality of participants of the synchronous communication session.

One or more of the following features may be included. The composite audio signal may include metadata that identifies the plurality of participants. The composite audio signal may be broadcast to a plurality of broadcast recipients. The synchronous communication session may be occurring within a social network. The plurality of participants of the synchronous communication session may be a subportion of all of the participants of the synchronous communication session.

Processing the plurality of sequential time slices to identify one or more copyright-infringing time slices may include comparing identified copyrighted content to content included within the plurality of sequential time slices. The identified copyrighted content may be defined within a copyrighted content database. The discrete audio signal of the copyright infringing participant may include identified copyrighted content defined within the copyrighted content database. Associating the one or more copyright-infringing time slices with the copyright infringing participant may include identifying a signal level for each of the discrete audio signals included within each of the copyright-infringing time slices, wherein each of the discrete audio signals is associated with one of the plurality of participants. Associating the one or more copyright-infringing time slices with the copyright infringing participant may further include identifying a correlation between the one or more copyright-infringing time slices and the signal level for each of the discrete audio signals included within each of the copyright-infringing time slices.

In another implementation, a computing system including a processor and memory is configured to perform operations including receiving a plurality of discrete audio signals from a plurality of participants of a synchronous communication session. The plurality of discrete audio signals are combined to form a composite audio signal. At least a portion of the composite audio signal is divided into a plurality of sequential time slices. The plurality of sequential time slices are processed to identify one or more copyright-infringing time slices. The one or more copyright-infringing time slices are associated with a copyright infringing participant chosen from the plurality of participants of the synchronous communication session.

One or more of the following features may be included. The composite audio signal may include metadata that identifies the plurality of participants. The composite audio signal may be broadcast to a plurality of broadcast recipients. The synchronous communication session may be occurring within a social network. The plurality of participants of the synchronous communication session may be a subportion of all of the participants of the synchronous communication session.

Processing the plurality of sequential time slices to identify one or more copyright-infringing time slices may include comparing identified copyrighted content to content included within the plurality of sequential time slices. The identified copyrighted content may be defined within a copyrighted content database. The discrete audio signal of the copyright infringing participant may include identified copyrighted content defined within the copyrighted content database. Associating the one or more copyright-infringing time slices with the copyright infringing participant may include identifying a signal level for each of the discrete audio signals included within each of the copyright-infringing time slices, wherein each of the discrete audio signals is associated with one of the plurality of participants. Associating the one or more copyright-infringing time slices with the copyright infringing participant may further include identifying a correlation between the one or more copyright-infringing time slices and the signal level for each of the discrete audio signals included within each of the copyright-infringing time slices.

The details of one or more implementations are set forth in the accompanying drawings and the description below.

Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
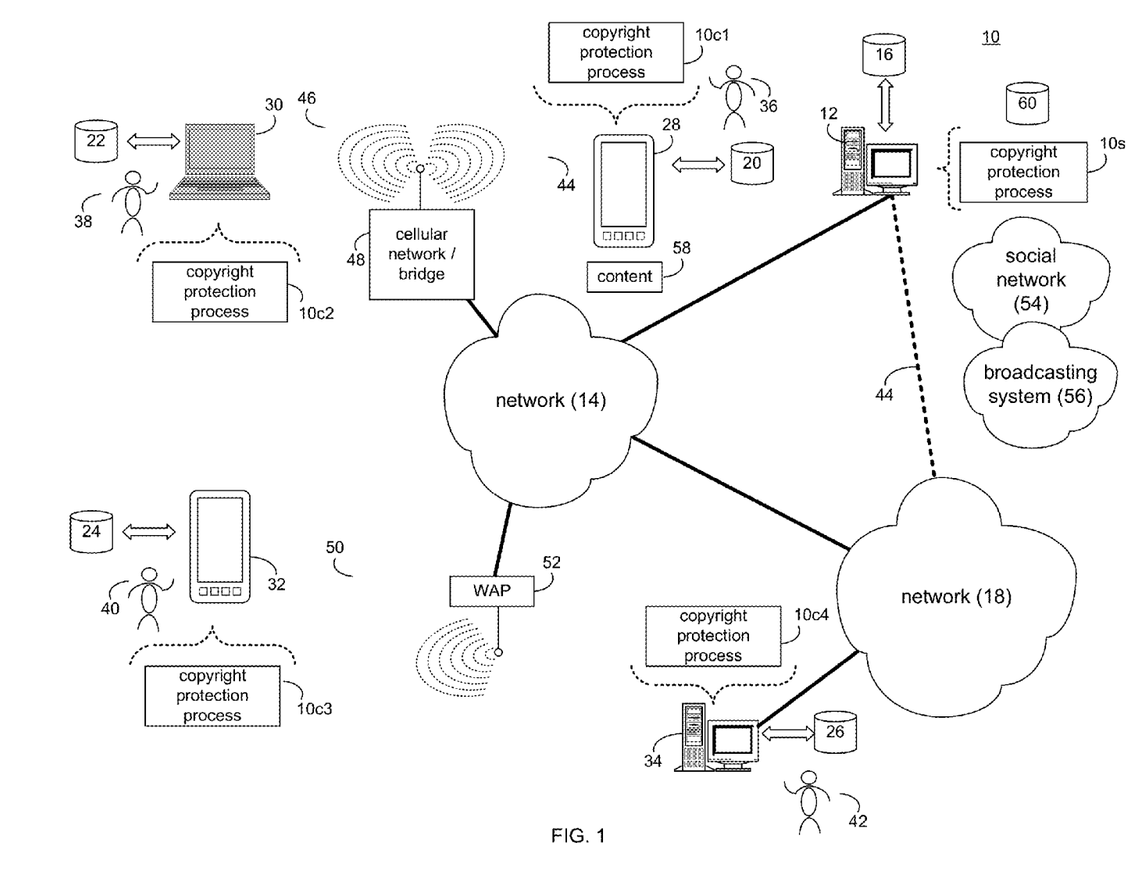
FIG. 1 is a diagrammatic view of a distributed computing network including a computing device that executes a copyright protection process according to an embodiment of the present disclosure.
Figure 2:
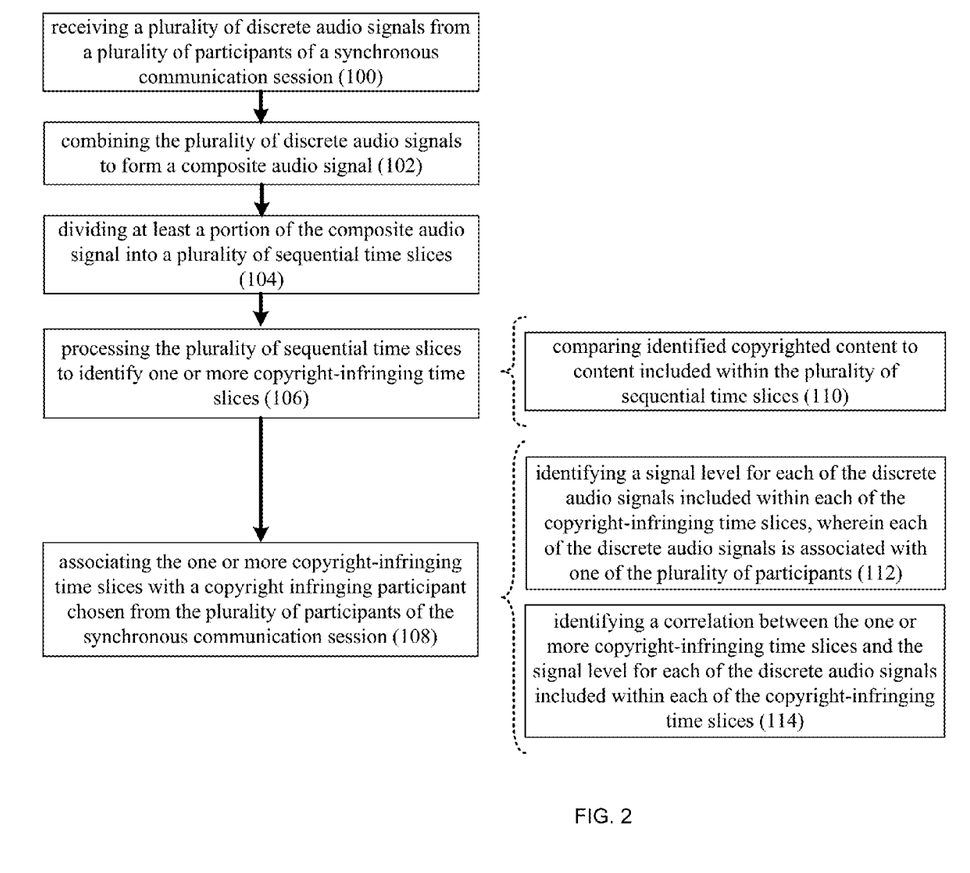
FIG. 2 is a flowchart of the copyright protection process of FIG. 1 according to an embodiment of the present disclosure.

In FIGS. 1 & 2, there is shown copyright protection process 10. Copyright protection process 10 may be implemented as a server-side process, a client-side process, or a hybrid server-side/client-side process. For example, copyright protection process 10 may be implemented as a purely server-side process via copyright protection process $10s$. Alternatively, copyright protection process 10 may be implemented as a purely client-side process via one or more of copyright protection process $10c1$, copyright protection process $10c2$, copyright protection process $10c3$, and copyright protection process $10c4$. Alternatively still, copyright protection process 10 may be implemented as a hybrid server-side/client-side process via copyright protection process $10s$ in combination with one or more of copyright protection process $10c1$, copyright protection process $10c2$, copyright protection process $10c3$, and copyright protection process $10c4$. Accordingly, copyright protection process 10 as used in this disclosure may include any combination of copyright protection process $10s$, copyright protection process $10c1$, copyright protection process $10c2$, copyright protection process $10c3$, and copyright protection process $10c4$.

As will be discussed below in greater detail, copyright protection process 10 may receive 100 a plurality of discrete audio signals from a plurality of participants of a synchronous communication session and combine 102 the plurality of discrete audio signals to form a composite audio signal. At least a portion of the composite audio signal may be divided 104 into a plurality of sequential time slices and the plurality of sequential time slices may be processed 106 to identify one or more copyright-infringing time slices. The one or more copyright-infringing time slices may be associated 108 with a copyright infringing participant chosen from the plurality of participants of the synchronous communication session.

Copyright protection process $10s$ may be a server application and may reside on and may be executed by computing device 12, which may be connected to network 14 (e.g., the Internet or a local area network). Examples of computing device 12 may include, but are not limited to: a personal computer, a laptop computer, a tablet computer, a personal digital assistant, a data-enabled cellular telephone, a notebook computer, a television with one or more processors embedded therein or coupled thereto, a server computer, a series of server computers, a mini computer, a mainframe computer, or a dedicated network device.

The instruction sets and subroutines of copyright protection process $10s$, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of copyright protection processes $10c1$, $10c2$, $10c3$, $10c4$ may include but are not limited to a web browser, a game console user interface, a social network user interface, or a specialized application. The instruction sets and subroutines of copyright protection processes $10c1$, $10c2$, $10c3$, $10c4$, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, data-enabled, cellular telephone 28, laptop computer 30, personal digital assistant 32, personal computer 34, a tablet computer (not shown), a notebook computer (not shown), a server computer (not shown), a smart television (not shown), a gaming console (not shown), and a dedicated network device (not shown). Client electronic devices 28, 30, 32, 34 may each execute an operating system.

Users 36, 38, 40, 42 may access copyright protection process 10 directly through network 14 or through secondary network 18. Further, copyright protection process 10 may be connected to network 14 through secondary network 18, as illustrated with link line 44.

The various client electronic devices (e.g., client electronic devices 28, 30, 32, 34) may be directly or indirectly coupled to network 14 (or network 18). For example, data-enabled, cellular telephone 28 and laptop computer 30 are shown wirelessly coupled to network 14 via wireless communication channels 44, 46 (respectively) established between data-enabled, cellular telephone 28, laptop computer 30 (respectively) and cellular network/bridge 48, which is shown directly coupled to network 14. Further, personal digital assistant 32 is shown wirelessly coupled to network 14 via wireless communication channel 50 established between personal digital assistant 32 and wireless access point (i.e., WAP) 52, which is shown directly coupled to network 14. Additionally, personal computer 34 is shown directly coupled to network 18 via a hardwired network connection.

WAP 52 may be, for example, an IEEE 802.11a, 802.11b, 802.11g, 802.11n, Wi-Fi, and/or Bluetooth device that is capable of establishing wireless communication channel 50 between personal digital assistant 32 and WAP 52. As is known in the art, IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

As is known in the art, users of social networks (e.g., social network 54) may be able to participate in group communication sessions, such as synchronous communication sessions (e.g., video conferences) that may allow for virtual gatherings of people so that they may chat about various topics.

Copyright protection process 10 may be included within, executed within, or a portion of social network 54. Alternatively, copyright protection process 10 may be included within, executed within, or a portion of Internet-based broadcasting system 56. Further, copyright protection process 10 may be a stand-alone application that may be configured to interface with social network 54 and/or Internet-based broadcasting system 56. Additionally, Internet-based broadcasting system 56 may be included within, executed within, or a portion of social network 54.

Figure 3:
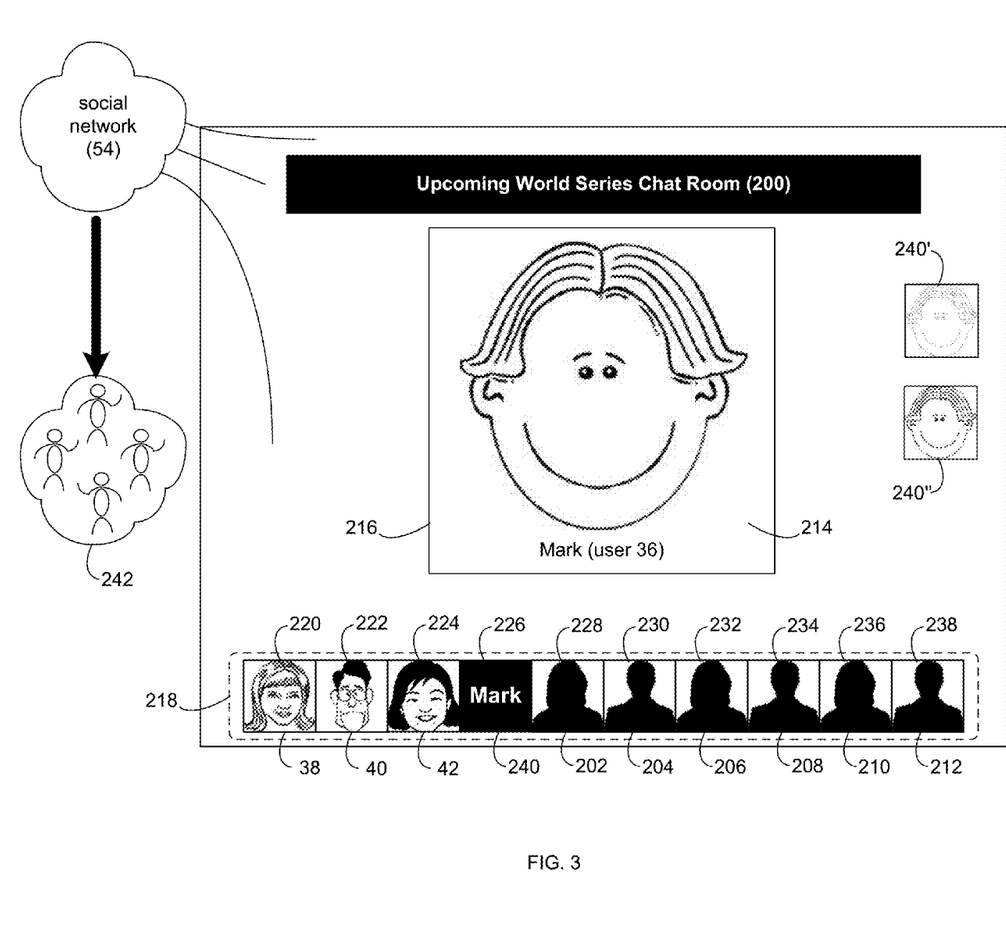
FIG. 3 is a diagrammatic view of a display screen rendered by a social network of FIG. 1 according to an embodiment of the present disclosure.

Referring also to FIG. 3, assume for illustrative purposes that user 36 (i.e. Mark) is an avid baseball fan and is looking forward to the upcoming World Series, and that Mary (user 38), Joe (user 40), and Cindy (user 42) are also baseball fans. Further assume for illustrative purposes that user 36, 38, 40, 42 wish to participate in synchronous communication session 200 so that they may discuss the upcoming World Series. Accordingly and in this illustrative example, user 36 may utilize social network 54 to effectuate such synchronous communication session 200.

While the following discussion concerns synchronous communication session 200 being an audio-video, synchronous communication session, this is for illustrative purposes only and is not intended to be a limitation of this disclosure, as other configurations are possible (e.g., a multi-user, video conference that includes one or more audio-only participants) and are considered to be within the scope of this disclosure.

Social network 54 may provide synchronous communication session 200 for users 36, 38, 40, 42. Assume for illustrative purposes that additional users are also participating in synchronous communication session 200, namely users 202, 204, 206, 208, 210, 212.

Social network 54 may be configured to provide visual prominence to the user that is currently speaking within synchronous communication session 200. Assume for illustrative purposes that when synchronous communication session 200 is started, user 36 leads off the discussion concerning the upcoming World Series. Accordingly, social network 54 may provide visual prominence to user 36, as user 36 is currently addressing the remaining users (e.g., users 38, 40, 42, 202, 204, 206, 208, 210, 212) of the plurality of users within synchronous communication session 200. Therefore, social network 54 may render a first video stream (e.g., video stream 214) of a first user (e.g., user 36) of the plurality of users (e.g., users 36, 38, 40, 42, 202, 204, 206, 208, 210, 212) within a primary viewing field (e.g., primary viewing field 216) associated with synchronous communication session 200. Whenever one of the other users (e.g., users 38, 40, 42, 202, 204, 206, 208, 210, 212) speaks within synchronous communication session 200, social network 54 may be configured to automatically position the video stream associated with the speaking user within primary viewing field 216.

Synchronous communication session 200 may include secondary viewing field 218 associated with synchronous communication session 200, which may include a plurality of portions (e.g., one for each of the participants of synchronous communication session 200). While in this particular example, secondary viewing field 218 is shown to include ten portions (namely portions 220, 222, 224, 226, 228, 230, 232, 234, 236, 238), this is for illustrative purposes only and is not intended to be a limitation of this disclosure, as other configurations are possible and are considered to be within the scope of this disclosure. Specifically, the quantity of portions included within secondary viewing field 218 may be increased/decreased depending upon the number of users participating in synchronous communication session 200.

Since social network 54 may provide visual prominence to the user that is currently addressing the remaining users within synchronous communication session 200, primary viewing field 216 may be larger than each of the plurality of portions (namely portions 220, 222, 224, 226, 228, 230, 232, 234, 236, 238) included within the secondary viewing field 218.

Social network 54 may render a placeholder (e.g., placeholder 240) for the first user (e.g., user 36 who is currently speaking) of the plurality of users (e.g., users 36, 38, 40, 42, 202, 204, 206, 208, 210, 212) within a first portion (e.g., portion 226) of secondary viewing field 218.

Placeholder 240 for the first user (e.g., user 36) of the plurality of users (e.g., users 36, 38, 40, 42, 202, 204, 206, 208, 210, 212) may include information concerning the first user (e.g., user 36), that is the user who is currently speaking. Examples of such information may include but is not limited to one or more of: identification information for the first user (e.g., user 36), such as name and title; and/or contact information for the first user (e.g., user 36), such as an email address, a mailing address, a home phone number, an office phone number, a cell phone number, a social network user name, or a webpage.

Alternatively, placeholder 240 for the first user (e.g., user 36) of the plurality of users (e.g., users 36, 38, 40, 42, 202, 204, 206, 208, 210, 212) may include a partially-obscured, reduced-scale version of the video stream (e.g., video stream 214) of the first user (e.g., user 36). An example of such a partially-obscured, reduced-scale version of the video stream (e.g., video stream 214) of user 36 may include but is not limited to a grayed-out version (e.g., alternate placeholder 240') of the video stream (e.g., video stream 214).

Alternatively still, placeholder 240 for the first user (e.g., user 36) of the plurality of users (e.g., users 36, 38, 40, 42, 202, 204, 206, 208, 210, 212) may include a reduced-scale version of the video stream (e.g., video stream 214) of the first user (e.g., user 36). An example of such a reduced-scale version of the video stream (e.g., video stream 214) of user 36 may include but is not limited to a smaller version (e.g., alternate placeholder 240") of the video stream (e.g., video stream 214).

Further, social network 54 may render a video stream of the remaining users of the plurality of users (e.g., users 38, 40, 42, 202, 204, 206, 208, 210, 212) within the remaining portions of secondary viewing field 218. Specifically: a video stream for user 38 may be rendered within portion 220 of secondary viewing field 218; a video stream for user 40 may be rendered within portion 222 of secondary viewing field 218; a video stream for user 42 may be rendered within portion 224 of secondary viewing field 218; a video stream for user 202 may be rendered within portion 228 of secondary viewing field 218; a video stream for user 204 may be rendered within portion 230 of secondary viewing field 218; a video stream for user 206 may be rendered within portion 232 of secondary viewing field 218; a video stream for user 208 may be rendered within portion 234 of secondary viewing field 218; a video stream for user 210 may be rendered within portion 236 of secondary viewing field 218; and a video stream for user 212 may be rendered within portion 238 of secondary viewing field 218.

As discussed above and in this example, a plurality of users (e.g., users 36, 38, 40, 42, 202, 204, 206, 208, 210, 212) may participate within synchronous communication session 200, wherein a video stream associated with each of these users is rendered (by social network 54) within either (in this example) primary viewing field 216 or the various portions (e.g., portions 220, 222, 224, 226, 228, 230, 232, 234, 236, 238) included within secondary viewing field 218. Social network 54 and/or Internet-based broadcasting system 56 may broadcast the video feed visible within primary viewing field 216 to plurality of broadcast recipients 242. Alternatively, social network 54 and/or Internet-based broadcasting system 56 may broadcast all of the video feeds visible within primary viewing field 216 and the secondary viewing field 218 (or any portion thereof) to plurality of broadcast recipients 242. Through the use of the above-described Internet broadcasting, the content of synchronous communication session 200 may be provided to a much greater number of people than e.g., the ten participants of synchronous communication session 200. Accordingly, if synchronous communication session 200 involves e.g., a celebrity or a world leader, the content of synchronous communication session 200 may be broadcast to millions of people.

Figure 4:
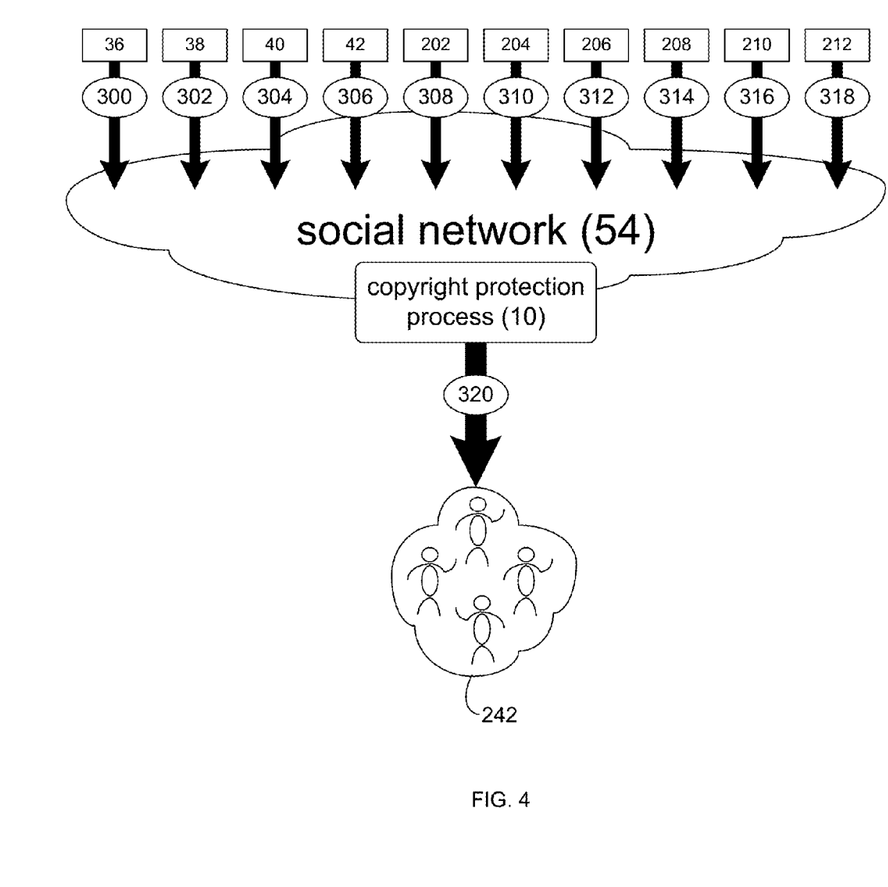
FIG. 4 is a diagrammatic view of audio signals received by the copyright protection process of FIG. 1 according to an embodiment of the present disclosure.

Referring also to FIG. 4, a discrete audio signal may be associated with each of the above-described video feeds, wherein these discrete audio signals are provided (by the various client electronic devices used by the participants of synchronous communication session 200) to social network 54. For example, social network 54 may be provided with: audio signal 300 from user 36; audio signal 302 from user 38; audio signal 304 from user 40; audio signal 306 from user 42; audio signal 308 from user 202; audio signal 310 from user 204; audio signal 312 from user 206; audio signal 314 from user 208; audio signal 316 from user 210; and audio signal 318 from user 212.

Copyright protection process 10 may receive 100 a plurality of discrete audio signals (e.g., some or all of audio signals 300, 302, 304, 306, 308, 310, 312, 314, 316, 318) from a plurality of participants (e.g., some or all of users 36, 38, 40, 42, 202, 204, 206, 208, 210, 212) of synchronous communication session 200 and may combine 102 this plurality of discrete audio signals (e.g., some or all of audio signals 300, 302, 304, 306, 308, 310, 312, 314, 316, 318) to form composite audio signal 320. Composite audio signal 320 may be broadcast over the Internet (by e.g., social network 54 and/or Internet-based broadcasting company 56) to plurality of broadcast recipients 242. As discussed above, through the use of this Internet broadcasting, the content of synchronous communication session 200 may be provided to a much greater number of people than e.g., the ten participants of synchronous communication session 200.

For illustrative purposes, assume that copyright protection process 10 may combine 102 fewer than all ten of audio signals 300, 302, 304, 306, 308, 310, 312, 314, 316, 318 when forming composite audio signal 320. Therefore, the above-referenced plurality of participants of synchronous communication session 200 may be a subportion of all of the participants (e.g., users 36, 38, 40, 42, 202, 204, 206, 208, 210, 212) of synchronous communication session 200. Assume for illustrative purposes that copyright protection process 10 combines 102 the top three strongest audio signals to form composite audio signal 320. Further assume that as signal strengths change (one participant speaks . . . and then another . . . and then a third), the three signals that copyright protection process 10 combines 102 to form composite audio signal 320 may also change.

For illustrative purposes, assume that audio signals 300, 302, 314 initially are the strongest audio signals. Accordingly, copyright protection process 10 may receive 100 a plurality of discrete audio signals (e.g., audio signals 300, 302, 314) from a plurality of participants (e.g., 36, 38, 208) of synchronous communication session 200 and may combine 102 this plurality of discrete audio signals (e.g., audio signals 300, 302, 314) to form composite audio signal 320.

Figure 5:
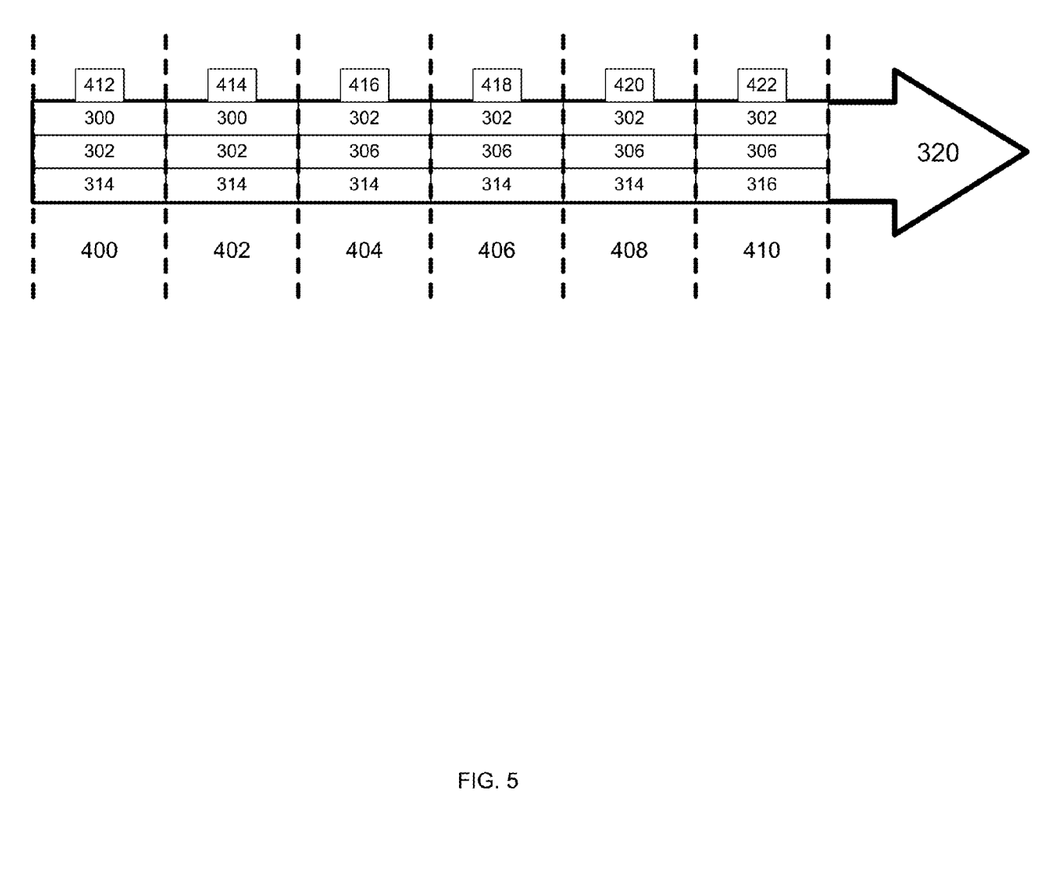
FIG. 5 is a diagrammatic view of a composite audio signal generated by the copyright protection process of FIG. 1 according to an embodiment of the present disclosure.

Referring also to FIG. 5, copyright protection process 10 may divide 104 at least a portion of composite audio signal 320 into a plurality of sequential time slices. For example, copyright protection process 10 may divide 104 composite audio signal 320 into six ten second slices (e.g., slices 400, 402, 404, 406, 408, 410). While in this particular example, composite audio signal 320 is shown to include six ten second slices (namely slices 400, 402, 404, 406, 408, 410), this is for illustrative purposes only, as the number of slices will vary depending upon the length of composite audio signal 320, and the length of each slice (e.g., ten seconds) may vary depending upon the desired level of granularity of copyright protection process 10.

As discussed above, as signal strengths change (one participant speaks . . . and then another . . . and then a third), the three signals that copyright protection process 10 combines 102 to form composite audio signal 320 may also change. While audio signals 300, 302, 314 are described above as initially having the strongest signal strengths, assume that after twenty seconds (e.g., at the end of slice 402/beginning of slice 404), user 36 stops speaking and user 42 begins to speak (and continues speaking for thirty second). Accordingly and for slices 404, 406, 408, audio signals 302 (for user 38), 306 (for user 42), 314 (for user 208) may have the strongest signal strengths. Further assume that just prior to the sixth slice (e.g., slice 410), user 202 stops speaking and user 204 begins to speak. Accordingly and for slice 410, audio signals 302 (for user 38), 306 (for user 42), 316 (for user 210) may have the strongest signal strengths.

Composite audio signal 320 may include metadata (e.g., metadata 412, 414, 416, 418, 420, 422) that may identify the plurality of participants who provided audio signals for each of the various slices included within composite audio signal 320. For example: metadata 412 may define that slice 400 includes audio signal 300, 302, 314 associated with users 36, 38, 208 (respectively); metadata 414 may define that slice 402 includes audio signal 300, 302, 314 associated with users 36, 38, 208 (respectively); metadata 416 may define that slice 404 includes audio signal 302, 306, 314 associated with users 38, 42, 208 (respectively); metadata 418 may define that slice 406 includes audio signal 302, 306, 314 associated with users 38, 42, 208 (respectively); metadata 420 may define that slice 408 includes audio signal 302, 306, 314 associated with users 38, 42, 208 (respectively); and metadata 422 may define that slice 410 includes audio signal 302, 306, 316 associated with users 38, 42, 210 (respectively);

Copyright protection process 10 may process 106 the plurality of sequential time slices (e.g., slices 400, 402, 404, 406, 408, 410) to identify one or more copyright-infringing time slices. For example, when processing 106 sequential time slices 400, 402, 404, 406, 408, 410 to identify one or more copyright-infringing time slices, copyright protection process 10 may compare 110 identified copyrighted content (e.g., identified copyrighted content 60) to the audio content included within plurality of sequential time slices 400, 402, 404, 406, 408, 410. Identified copyrighted content 60 may be defined within a copyrighted content database (not shown) accessible by copyright protection process 10. For example, the slices (e.g., slices 400, 402, 404, 406, 408, 410) included within composite audio signal 320 and broadcast to plurality of broadcast recipients 242 may be compared to identified copyrighted content 60 to determine if matches occur. Accordingly, if one or more of slices 400, 402, 404, 406, 408, 410 includes copyrighted audio (such as a copyrighted song being broadcast in the background), copyright protection process 10 may identify the one or more copyright-infringing time slices. Assume for illustrative purposes that all of slices 400, 402, 404, 406, 408, 410 include copyrighted audio defined within identified copyrighted content 60 and, therefore, are copyright-infringing time slices.

Copyright protection process 10 may associate 108 the one or more copyright-infringing time slices (e.g., slices 400, 402, 404, 406, 408, 410) with a copyright infringing participant chosen from the plurality of participants of synchronous communication session 200. As discussed above, composite audio signal 320 may include metadata (e.g., metadata 412, 414, 416, 418, 420, 422) that may identify the plurality of participants who provided audio signals for each of the various slices included within composite audio signal 320. Accordingly, copyright protection process 10 may utilize metadata 412, 414, 416, 418, 420, 422 to associate 108 copyright-infringing time slices 400, 402, 404, 406, 408, 410 with a copyright infringing participant. In this particular example, metadata 412, 414, 416, 418, 420, 422 may reveal that only users 36, 38, 42, 208, 210 contributed audio signals to any of copyright-infringing time slices 400, 402, 404, 406, 408, 410, Specifically, when associating 108 copyright-infringing time slices 400, 402, 404, 406, 408, 410 with the copyright infringing participant, copyright protection process 10 may identify 112 a signal level for each of the discrete audio signals included within each of copyright-infringing time slices 400, 402, 404, 406, 408, 410. Specially, copyright protection process 10 may confirm that each of the discrete audio signals included within composite audio signal 320 each meets a defined threshold to ensure that e.g., a discrete audio signal is not just providing barely discernible background noise. For example, if a discrete audio signal has a signal strength of less than e.g., 4%, copyright protection process 10 may deem such a weak signal to be too weak to be broadcasting such copyrighted audio. Assume for illustrative purposes that each discrete audio signal used to make up each of copyright-infringing time slices 400, 402, 404, 406, 408, 410 meets or exceeds such a threshold.

Further and when associating 108 copyright-infringing time slices 400, 402, 404, 406, 408, 410 with the copyright infringing participant, copyright protection process 10 may identify 114 a correlation between copyright-infringing time slices 400, 402, 404, 406, 408, 410 and the signal level for each of the discrete audio signals included within copyright-infringing time slices 400, 402, 404, 406, 408, 410.

Since copyright-infringing time slices 400, 402, 404, 406, 408, 410 each include the above-described copyrighted audio and each discrete audio signal used to make up each of copyright-infringing time slices 400, 402, 404, 406, 408, 410 meets or exceeds the above-described threshold, copyright protection process 10 may identify 114 which participant of synchronous communication session 200 contributed a discrete audio signal to each of copyright-infringing time slices 400, 402, 404, 406, 408, 410 (when associating 208 copyright-infringing time slices 400, 402, 404, 406, 408, 410 with the copyright infringing participant).

In this particular example, only one participant (e.g., user 38) contributed a discrete audio signal (e.g., audio signal 302) to each of copyright-infringing time slices 400, 402, 404, 406, 408, 410. Accordingly, copyright protection process 10 may identify user 38 of synchronous communication session 200 as the participant that is contributing the identified copyrighted content (e.g., a copyrighted song) defined within the copyrighted content database to composite audio signal 320 (via e.g., audio signal 302).

Copyright protection system 10 may be configured to take remedial action against user 38. For example, user 38 may be disconnected from synchronous communication session 200. Alternatively/additionally, copyright protection system 10 may suspend user 38 from social network 54 and/or Internet-based broadcasting system 56.

Figure 6:
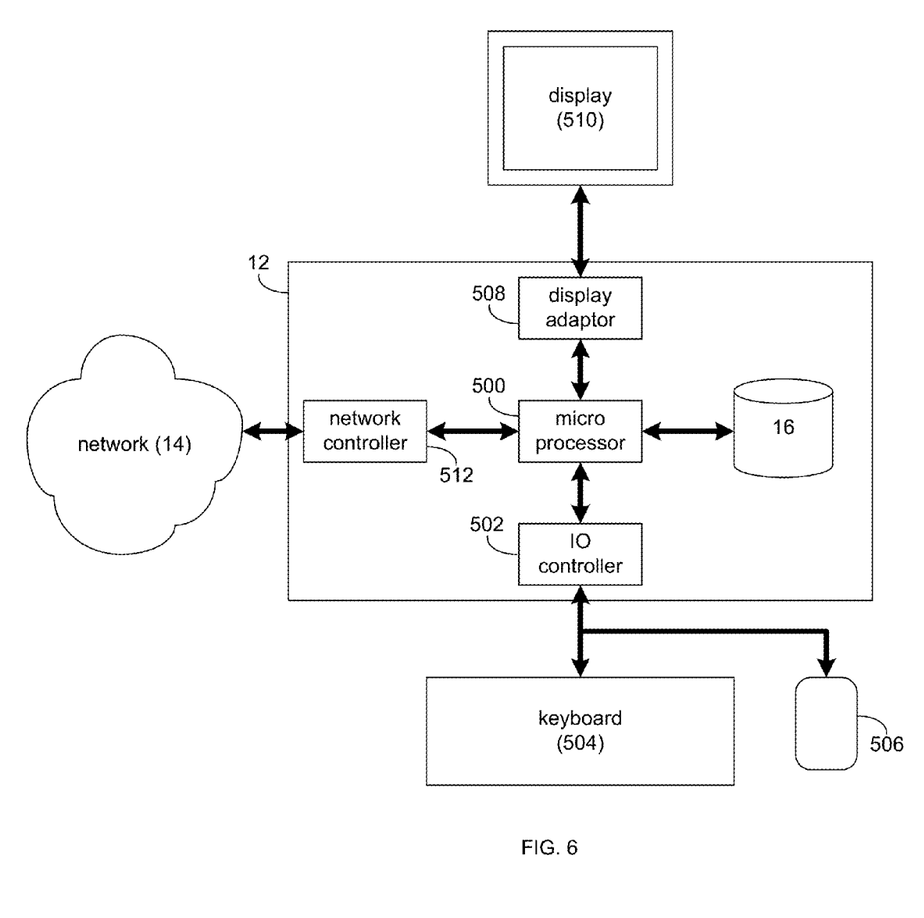
FIG. 6 is a diagrammatic view of the computing device of FIG. 1 according to an embodiment of the present disclosure.

Referring also to FIG. 6, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, copyright protection process 10 may be substituted for computing device 12 within FIG. 5, examples of which may include but are not limited to client electronic devices 28, 30, 32, 34.

Computing system 12 may include microprocessor 500 configured to e.g., process data and execute instructions/code for copyright protection process 10. Microprocessor 500 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 502 may be configured to couple microprocessor 500 with various devices, such as keyboard 504, mouse 506, USB ports (not shown), and printer ports (not shown). Display adaptor 508 may be configured to couple display 510 (e.g., a CRT or LCD monitor) with microprocessor 500, while network adapter 512 (e.g., an Ethernet adapter) may be configured to couple microprocessor 500 to network 14 (e.g., the Internet or a local area network).

As will be appreciated by one skilled in the art, the present disclosure may be embodied as a method (e.g., executing in whole or in part on computing device 12), a system (e.g., computing device 12), or a computer program product (e.g., encoded within storage device 16). Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., storage device 16) having computer-usable program code embodied in the medium.

Any suitable computer usable or computer readable medium (e.g., storage device 16) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 500) of a general purpose computer/special purpose computer/other programmable data processing apparatus (e.g., computing device 12), such that the instructions, which execute via the processor (e.g., processor 500) of the computer or other programmable data processing apparatus, create means for implementing the functions/acts specified in the flowchart and/or block diagram block or blocks.

These computer program instructions may also be stored in a computer-readable memory (e.g., storage device 16) that may direct a computer (e.g., computing device 12) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 12) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method comprising:
receiving discrete audio signals from a plurality of participants of a synchronous communication session, wherein each of the discrete audio signals is associated with one of the plurality of participants;
identifying a signal level for each of the discrete audio signals;
selecting a dynamic subset of the plurality of participants based on the signal level for each of the discrete audio signals, wherein the dynamic subset of the plurality of participants changes as at least one of the signal levels changes;
combining the discrete audio signals to form a composite audio signal;
dividing at least a portion of the composite audio signal into a number of a plurality of sequential time slices, wherein the number of the plurality of sequential time slices is based, at least in part, on a length of the composite audio signal, and wherein a length of each of the sequential time slices is based, at least in part, on a predefined level of granularity;
processing the plurality of sequential time slices to identify one or more copyright-infringing time slices;
associating the one or more copyright-infringing time slices with a copyright infringing participant chosen from the subset of the plurality of participants of the synchronous communication session, wherein the associating includes identifying a correlation between the one or more copyright-infringing time slices and the signal level for each of the discrete audio signals included within each of the copyright-infringing time slices; and
performing one or more remedial actions, wherein the one or more remedial actions include at least one of: disconnecting the copyright infringing participant from the synchronous communication session and suspending the copyright infringing participant from a social network.

2. The computer-implemented method of claim 1 wherein the composite audio signal includes metadata that identifies the plurality of participants.

3. The computer-implemented method of claim 1 wherein the composite audio signal is broadcast to a plurality of broadcast recipients.

4. The computer-implemented method of claim 1 wherein the synchronous communication session is occurring within the social network.

5. The computer-implemented method of claim 1 wherein processing the plurality of sequential time slices to identify one or more copyright-infringing time slices includes:
comparing identified copyrighted content to content included within the plurality of sequential time slices.

6. The computer-implemented method of claim 5 wherein the identified copyrighted content is defined within a copyrighted content database.

7. The computer-implemented method of claim 6 wherein the discrete audio signal of the copyright infringing participant includes identified copyrighted content defined within the copyrighted content database.

8. A computing system including a processor and memory configured to perform operations comprising:
receiving discrete audio signals from a plurality of participants of a synchronous communication session, wherein each of the discrete audio signals is associated with one of the plurality of participants;
identifying a signal level for each of the discrete audio signals;
selecting a dynamic subset of the plurality of participants based on the signal level for each of the discrete audio signals, wherein the dynamic subset of the plurality of participants changes as at least one of the signal levels changes;
combining the discrete audio signals to form a composite audio signal;
dividing at least a portion of the composite audio signal into a number of a plurality of sequential time slices, wherein the number of the plurality of sequential time slices is based, at least in part, on a length of the composite audio signal, and wherein a length of each of the sequential time slices is based, at least in part, on a predefined level of granularity;
processing the plurality of sequential time slices to identify one or more copyright-infringing time slices;
associating the one or more copyright-infringing time slices with a copyright infringing participant chosen from the plurality of participants of the participants of the synchronous communication session, wherein the associating includes identifying a correlation between the one or more copyright-infringing time slices and the signal level for each of the discrete audio signals included within each of the copyright-infringing time slices; and
performing one or more remedial actions, wherein the one or more remedial actions include at least one of: disconnecting the copyright infringing participant from the synchronous communication session and suspending the copyright infringing participant from a social network.

9. The computing system of claim 8 wherein the composite audio signal includes metadata that identifies the plurality of participants.

10. The computing system of claim 8 wherein the composite audio signal is broadcast to a plurality of broadcast recipients.

11. The computing system of claim 8 wherein the synchronous communication session is occurring within the social network.

12. The computing system of claim 8 wherein processing the plurality of sequential time slices to identify one or more copyright-infringing time slices includes: comparing identified copyrighted content to content included within the plurality of sequential time slices.

13. The computing system of claim 12 wherein the identified copyrighted content is defined within a copyrighted content database.

14. The computing system of claim 13 wherein the discrete audio signal of the copyright infringing participant includes identified copyrighted content defined within the copyrighted content database.

* * * * *